United States Patent
Tormasov et al.

(10) Patent No.: US 11,403,892 B2
(45) Date of Patent: Aug. 2, 2022

(54) SYSTEM AND METHOD FOR POST-ROUTE ANALYSIS OF AN AUTONOMOUS VEHICLE

(71) Applicant: Acronis International GmbH, Schaffhausen (CH)

(72) Inventors: Alexander Tormasov, Moscow (RU); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 302 days.

(21) Appl. No.: 16/703,021

(22) Filed: Dec. 4, 2019

(65) Prior Publication Data

US 2020/0184741 A1    Jun. 11, 2020

Related U.S. Application Data

(60) Provisional application No. 62/775,409, filed on Dec. 5, 2018.

(51) Int. Cl.

| | |
|---|---|
| *G07C 5/08* | (2006.01) |
| *G06Q 50/26* | (2012.01) |
| *G06Q 50/30* | (2012.01) |
| *G05D 1/00* | (2006.01) |
| *G07C 5/02* | (2006.01) |
| *G06F 16/23* | (2019.01) |

(52) U.S. Cl.
CPC ............. *G07C 5/08* (2013.01); *G05D 1/0088* (2013.01); *G06F 16/2365* (2019.01); *G06Q 50/265* (2013.01); *G06Q 50/30* (2013.01); *G07C 5/02* (2013.01); *G05D 2201/0213* (2013.01)

(58) Field of Classification Search
CPC ......... G07C 5/08; G07C 5/02; G06F 16/2365; G05D 1/0088; G06Q 50/265; G06Q 50/30

See application file for complete search history.

(56) References Cited

U.S. PATENT DOCUMENTS

2021/0342946 A1 * 11/2021 Leise .................... H04L 9/0637

* cited by examiner

*Primary Examiner* — Michael D Lang
(74) *Attorney, Agent, or Firm* — ArentFox Schiff LLP; Michael Fainberg

(57) ABSTRACT

Disclosed herein are system and method for driving organization and subsequent analysis of an autonomous vehicle. In an exemplary aspect, the system and method comprise dividing a path of a vehicle into a plurality of segments based on predetermined conditions; monitoring both behavior of the vehicle and driving conditions during each of the plurality of segments; storing the behavior and the driving conditions in a plurality of records of an immutable storage; determining whether an accident has occurred involving the vehicle; in response to determining that the accident has occurred, retrieving for the plurality of segments the behavior and the driving conditions from the immutable storage; reconstructing the path using the retrieved behavior and the driving conditions and the plurality of segments; and analyzing the reconstructed path to determine a cause of the accident.

20 Claims, 4 Drawing Sheets

SYSTEM AND METHOD FOR POST-ROUTE ANALYSIS OF AN AUTONOMOUS VEHICLE

CROSS-REFERENCE TO RELATED APPLICATIONS

This application claims the benefit to U.S. Provisional application No. 62/775,409, filed on Dec. 5, 2018, the contents of which is hereby incorporated by reference in its entirety.

FIELD OF TECHNOLOGY

The present disclosure relates generally to the field of autonomous vehicle control, and more specifically, to systems and method for post-route analysis of an autonomous vehicle.

BACKGROUND

Autonomous vehicles generally operate with pre-programmed algorithms on how to move about locations such as cities, in the air and in the field. Typically, the movement comprises a pre-planned route, trajectory or the like. As the vehicles navigate, they make decisions regarding objects near them or in their path, and may choose to alter the route or path accordingly based on decision making algorithms.

In some cases, the autonomous vehicle may act in unexpected ways based on objects encountered during the route. Further, if the vehicle is involved in an accident with another object, it becomes very difficult to understand the cause of the accident because the cause can be an abundance of issues stemming from the environment, external objects, hardware issues in the autonomous vehicle, and software glitches. Thus, there exists a need to perform a post-mortem analysis of mistakes and other issues which may have caused the accident. This analysis can subsequently be used to prevent future accidents.

SUMMARY

Exemplary aspects are described herein in the context of a system, method, and computer program product or driving organization and subsequent analysis of an autonomous vehicle. In an exemplary aspect, a method comprises dividing, by a processor, a path of a vehicle into a plurality of segments based on predetermined conditions; monitoring, by the processor, both behavior of the vehicle and driving conditions during each of the plurality of segments; storing, by the processor, the behavior and the driving conditions in a plurality of records of an immutable storage; determining, by the processor, whether an accident has occurred involving the vehicle; in response to determining that the accident has occurred, retrieving for the plurality of segments, by a processor, the behavior and the driving conditions from the immutable storage; reconstructing, by the processor, the path using the retrieved behavior and the driving conditions and the plurality of segments; and analyzing, by the processor, the reconstructed path to determine a cause of the accident.

In some aspects, the immutable storage comprises one or more of a blockchain network, and a hash graph.

In some aspects, the method further comprises storing the behavior in remote immutable storage; determining that a network connection is lost; in response to losing the network connection, storing records in local immutable storage; and in response to the network being restored, synchronizing the local immutable storage with the remote immutable storage.

In some aspects, the vehicle is a first vehicle and the accident involves a second vehicle. The method further comprises identifying, from a plurality of records in the immutable storage, a first record indicating a first command executed by the first vehicle prior to the accident and a second record indicating a second command executed by the second vehicle; determining whether the first command is in a first master list of commands that the first vehicle should follow; determining whether the second command is in a second master list of commands that the second vehicle should follow; in response to determining that the first command is in the first master list and the second command is not in the second master list, determining that an incorrect movement by the second vehicle is the cause of the accident.

In some aspects, the method comprises in response to determining that the first command is not in the first master list and the second command is in the second master list, determining that an incorrect movement by the first vehicle is the cause of the accident.

In some aspects, the method comprises in response to determining that the first command is not in the first master list and the second command is not in the second master list, determining that incorrect movements by both vehicles are the cause of the accident.

In some aspects, the method comprises in response to determining that the first command is in the first master list and the second command is in the second master list, determining that an external factor is the cause of the accident.

In some aspects, the method comprises in response to determining that the first command is in the first master list and the second command is in the second master list, adjusting the first command and the second command in the first master list and the second master list, respectively, to prevent future accidents by the first vehicle and the second vehicle.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for post-route analysis of an autonomous vehicle system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
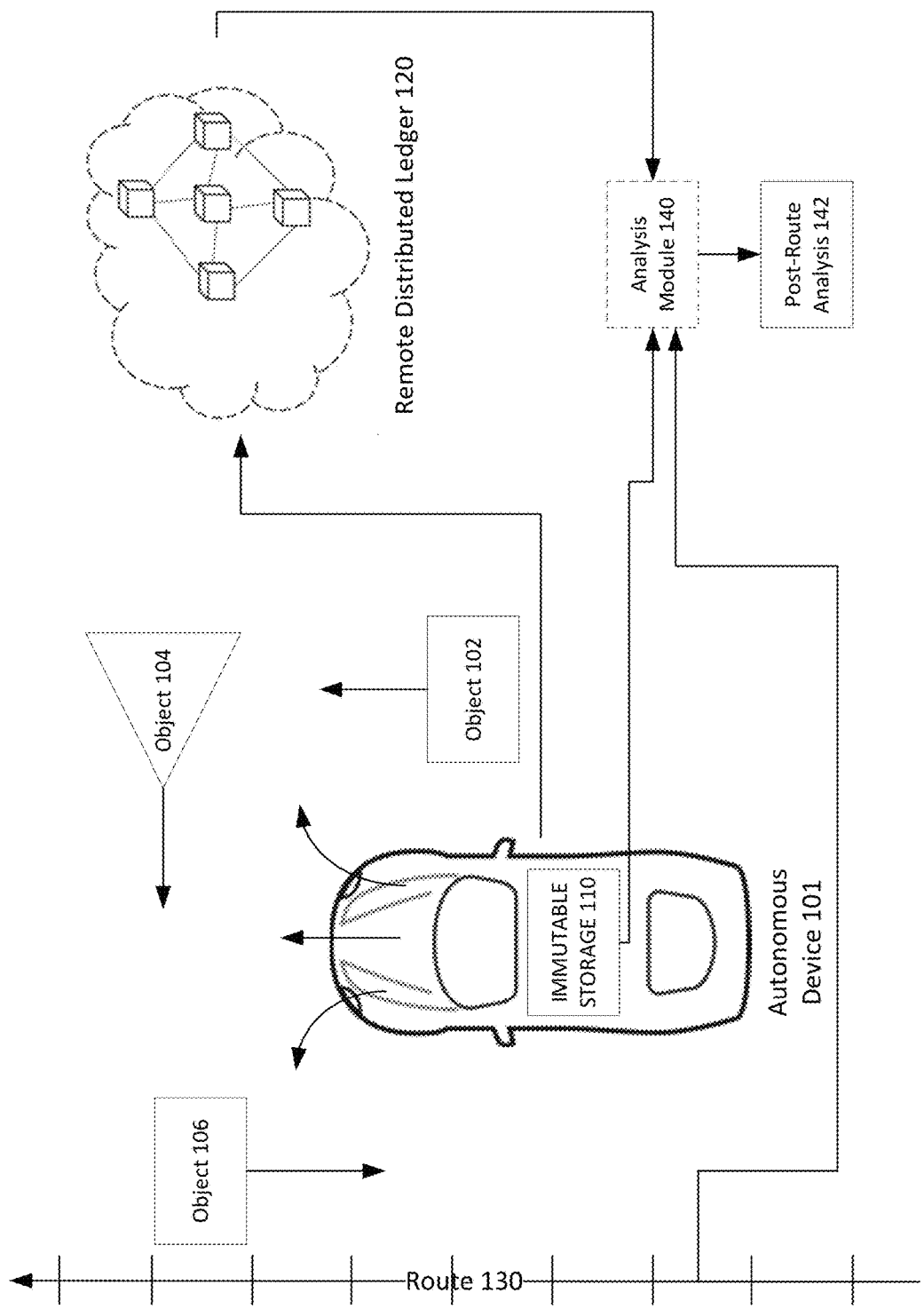
FIG. 1 is a diagram illustrating a system for post-route analysis of an autonomous vehicle system according to an exemplary aspect.

FIG. 1 is a diagram illustrating a system 100 for post-route analysis of an autonomous vehicle system, according to an exemplary aspect.

In exemplary aspects, the system 100 comprises an autonomous device 101 programmed to follow a route 130, beginning at a particular point and ending at a destination, storing information in immutable storage 110 local to the device 101 and to a remote distributed ledger 120, and an analysis module 140 that carries out analysis of the route to determine causes of accidents that occurred on the route.

In some aspects, the autonomous device 101 may be an autonomous vehicle such as a car, a bicycle, an airplane, a drone, or the like. The device 101 may be any device that can be programmed to operate without human aid during a path or route. In exemplary aspects, the route 130 may be on a city road, in the air, in a field, in water or the like.

According to exemplary aspects, the system 100 further comprises an analysis module 140 that analyzes the route 130 of the vehicle. Specifically, the system 100 obtains a formalized model of the route 130 (path, trajectory, or the like). In some aspects, the formalized model may be in the form of an electronic map, a particular navigation system, using geolocation services, satellites such as GPS or the like. In some aspects, the formalized model may be based on video recordings of the route, or live video cameras capturing/monitoring the route as the device 101 navigates. In some aspects, the analysis module 140 may compare the information received from a real-time camera with a previously made "master" video record of the route, or a segment of the route. If the analysis module detects any difference with respect to the reference record, the analysis module 140 may suggest a decision to resolve the problem or situation that has arisen. In other exemplary aspects, there may be other technical methods that define and monitor the route, such as RADAR, LIDAR and the like, that the analysis module 140 can access for information regarding route 130.

The analysis module 140 may further determine a segmentation method to divide the route into a plurality of segments that are smaller than a predetermined threshold and are predictable. In some aspects, "smaller" refers to the physical distance of the route, though smaller may also alternatively refer to a length of time it takes for the device 101 to travel the segment. The analysis module 140 may also perform the segmentation and apply the segmented route to the device 101. The segmentation helps to define a minimal segment, where such decision-making can be most efficient.

The segmentation algorithm can depend on the speed of the vehicle, on environment (e.g., the road), on weather conditions (e.g., snowing), etc. Thus, the segmentation algorithm, correctly chosen for these circumstances, is a factor in making the route predictable. The segmentation takes into account external circumstances for each minimum segment of the path, within which the analysis module 140 can allow the device 101 to choose an optimal solution.

In some aspects, the segmentation helps to define any actions or decision which a vehicle makes, because events inside each segment can be predicted. For example, all permanent objects are known within a particular segment. Therefore, the system 100 can predict events that may occur within this segment, as well as all other segments. In some aspects, the segment allows the system 100 to know, for example, the appearance of the road, a person or animal, obstruction (damage) to the road, appearance of other vehicles, or the like. For some events, the autonomous device 101 makes a choice, or decision if there are several ways to behave. Since the actions and decisions of the device 101 are monitored and recorded, later the system 100 can analyze the correctness of a particular decision. In some instances, the correctness may include: that the decision depended on the device 101 itself, or that the decision was dependent on a force majeure and the device 101 could not avoid an accident. According to exemplary aspects, segmentation allows for accurate determination of causes of an accident, collision or the like and is later used to improve operational algorithms of the device 101.

Furthermore, the analysis module 140 monitors and records vehicle, route and object information in the case of a collision or accident, and generates a post-route analysis 142 that either identifies the cause of the accident, or helps to identify the cause. In some aspects, the analysis module 140 is co-located with the device 101, while in other instances, the device 101 is provided an application programming interface (API) that can be used to access services of the analysis module 140, such as storing data, retrieving data, performing segmentation, and/or initiating post-route analysis based on recorded information.

In other aspects, the analysis module 140 may predict accidents or possible obstacles based on information recorded in temporally previous segments of the route. For example, if road work is detected in one segment, then depending on certain factors, or thresholds of probability, the analysis module 140 may determine that future segments may also contain such roadwork or hazards and may adjust the behavior of device 101 accordingly.

In order to generate the analysis, the autonomous device 101 uses the analysis module 140 to monitor all vehicle, route and object related information and store this information to a remote distributed ledger 120. The remote distributed ledger 120 allows the creation and access of records, but does not permit the modification of records. The remote distributed ledger 120 may be implemented, for example, as a block-chain network, though other structures such as hash graphs are also contemplated. In some aspects, as the device 101 operates during its route, the information about the route, objects and the vehicle is stored in the remote distributed ledger 120, and if a network connection to the ledger 120 is lost, the information is stored in the local immutable storage 110. A plurality of vehicles may write a list of executed commands and routes to the remote distributed ledger 120. Based on the records from each vehicle, or those specifically involved in any accident, analysis module 140 may determine which vehicle was at fault and evaluate how to prevent such accidents in the future. The use of remote distributed ledger 120 thus provides a way to compare records to identify which vehicles need to be reconfigured, and also ensures that stored information is not changed by accident or intentionally.

In some aspects, the immutable storage 110 can also be written to and read from, but records that are stored cannot be modified. In some aspects, immutable storage 110 may use hash graphs or the like, though other data structures are also contemplated. The immutable storage 110 stores information such as the route 130, various objects encountered during the route, such as object 102, 104 and 106. The immutable storage 110 may be coupled to the remote distributed ledger 120. In the case where network connection between the device 101 and the ledger 120 is lost, the device 101 will write the route, vehicle, and object information to the local immutable storage 110. Later, when the network connection is restored, the records stored in the local immutable storage 110 are synchronized with the ledger 120.

Figure 2:
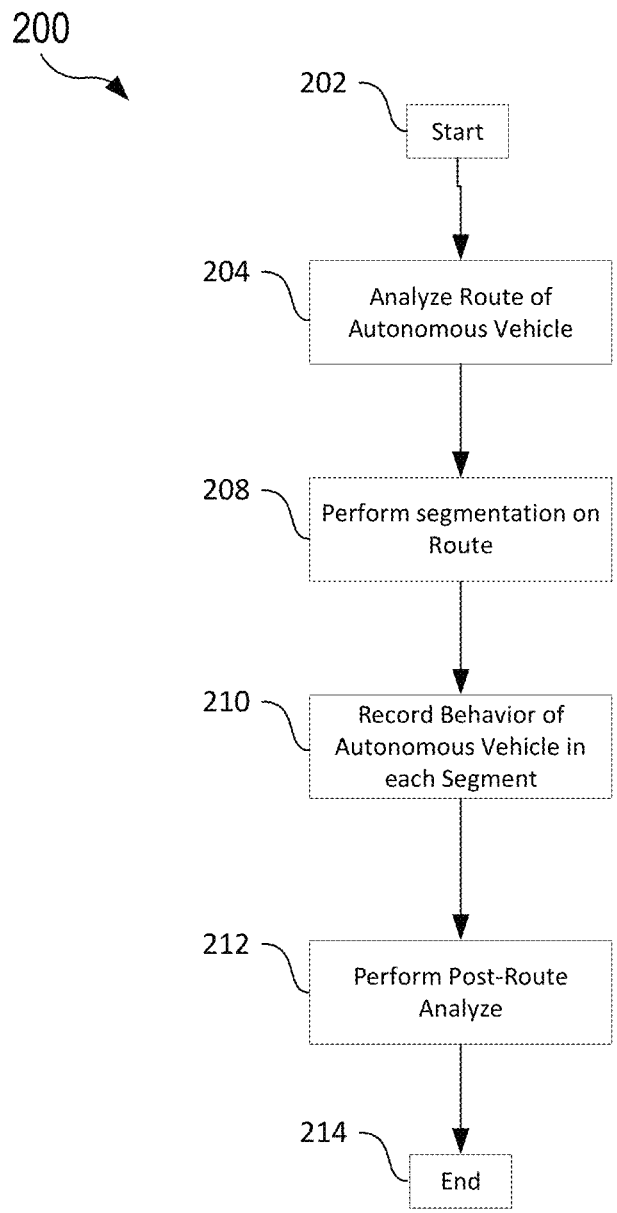
FIG. 2 is a flowchart illustrating a method for post-route analysis of an autonomous vehicle system according to an exemplary aspect.

FIG. 2 is a flowchart illustrating a method for post-route analysis of an autonomous vehicle system according to an exemplary aspect. It is noted that the following description of the exemplary method makes reference to the system and components described above.

The method 200 begins at 202 and proceeds to 204.

At step 204, the analysis module 140 analyzes a predefined route of an autonomous device, e.g., device 101.

At 206, the analysis module 140 performs the segmentation on the route according to a segmentation algorithm by dividing the route into short, predictable segments. In some aspects, each segment defines therein a set of possible behaviors of the device, depending on the situation and on external events. For example, this behavior may include "move forward", "stop", "avoid the oncoming object", or the like.

At 210, the analysis module 140 records the behavior of the device/vehicle in each of the plurality of segments as the device moves. Furthermore, the actions of the device/vehicle are also recorded. For example, actions or behaviors that are recorded may include: 1) the road is free—the device moves straight; 2) An obstacle appeared on the road—the device passes the obstacle to the right, because there are no other obstacles on the right, and it is impossible to pass it to the left for one reason or another. These are just examples of behavior and other behaviors or actions that are contemplated to be recorded by the analysis module 140. In some aspects, the methodology for segmentation is also recorded, as well as information that was taken into account when the device made a decision.

At 212, the analysis module 140 performs a post-route analysis that analyzes each route, the behaviors and actions of the device in response to obstacles, and the like in order to evaluate whether the autonomous vehicle acted as planned.

The method 200 terminates at step 214.

Figure 3:
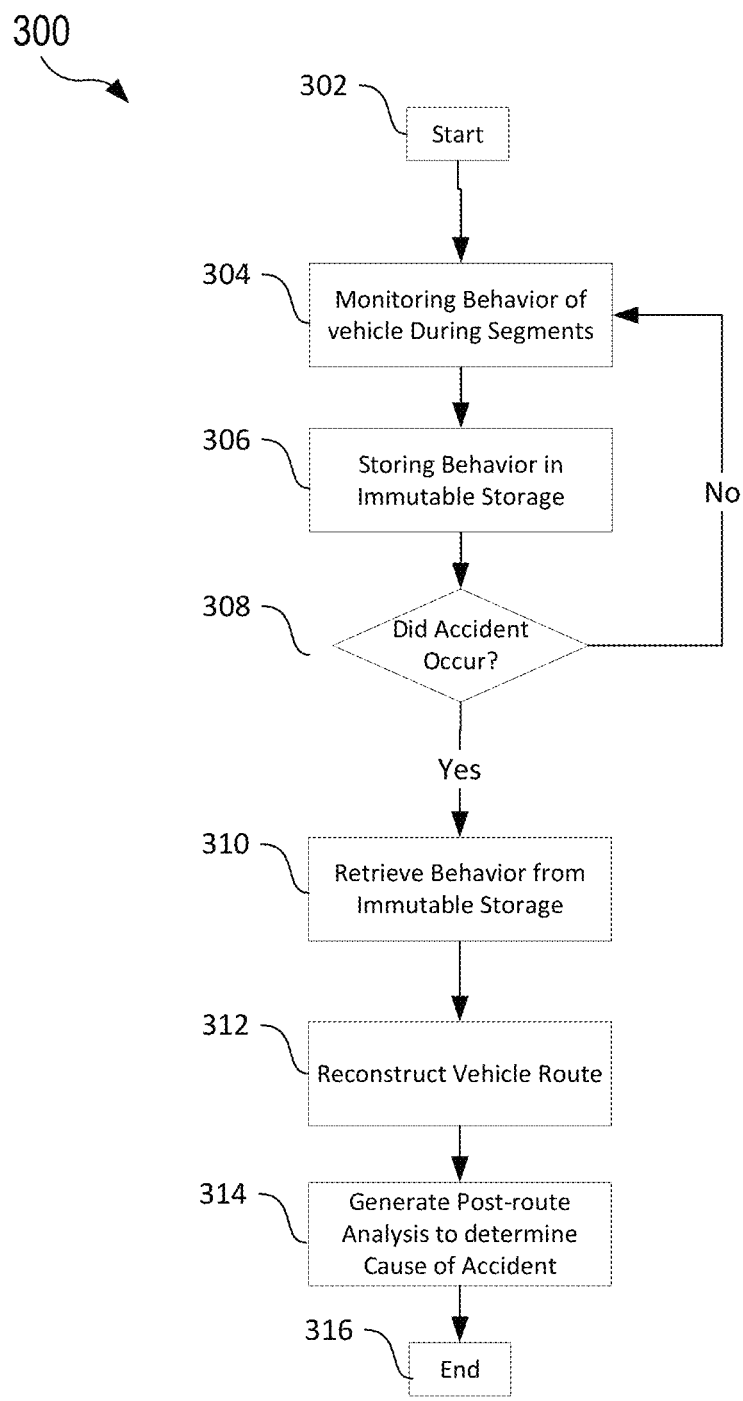
FIG. 3 is a flowchart illustrating another method for post-route analysis of an autonomous vehicle file system according to an exemplary aspect.

FIG. 3 is a flowchart illustrating another method for post-route analysis of an autonomous vehicle file system according to an exemplary aspect.

It is noted that the following description of the exemplary method makes reference to the system and components described above.

The method 300 starts at step 302, and proceeds to 304, where the analysis module 140 monitors behavior of an autonomous vehicle during the plurality of segments.

At 306, the behavior and action being monitored are stored in immutable storage, such as remote distributed ledger 120 and/or a "black-box" as in, once record, read only. In some aspects, both are used. For example, typically all records are sent to remote storage (e.g., ledger 120), but if network connection is lost, the records are stored in a local black box, e.g., immutable storage 110. These records in the black box are later synchronized with remote storage. However, the storage is immutable in that once a record is created, it cannot be modified, but only read. In some aspects, block-chain networks or hash-graphs may be used.

At 308, the analysis module 140 determines whether an accident has occurred. If no accident has occurred, the method returns to 304, otherwise the method proceeds to 310.

At 310, the analysis module 140 retrieves the entire stored behavior from the immutable storage.

At 312, the analysis module 140 reconstructs the vehicle route, including obstacles confronting the vehicle, actions by the vehicle and behaviors of the vehicle.

Using this information, the method 300 generates a post-route analysis to determine the cause of the accident at 314. The analysis may include conclusions regarding missteps by the vehicle where the vehicle failed to follow the behaviors provided, or conclusions regarding errors in the programming of behavior. Further, the analysis may provide conclusions regarding whether the vehicle caused the accident or other external circumstances, objects, or a combination of both, caused the accident.

In some aspects, the analysis module 140 may compare a list of commands that the vehicle was supposed to follow (e.g., move right by 0.5 meters) with a list of executed commands that the vehicle actually performed (e.g., the vehicle moved right by 0.1 meters causing a collision). The analysis module 140 then determines why the vehicle executed a different command (e.g., why the car only moved 0.1). In some aspects, the analysis module 140 compares captured video of the vehicle before an accident and compares the video with a "master" video showing perfect driving. Based on the differences between the videos, the analysis module 140 determines why the vehicle drove differently.

The final classification performed by the analysis module 140 may be determining whether (1) the accident was caused by an external force (particularly one that the vehicle could not respond to within its response time), (2) the accident was caused by an ineffective command (e.g., move 0.1 meters) that the car successfully followed but led to an accident, or (3) the accident was caused by an effective rule (e.g., move 0.5 meters) that the car was unable to follow.

For example, in an accident involving two vehicles that upload their executed commands to a distributed ledger, the respective commands (as found in records of the distributed ledger) can be compared to respective master lists of commands that the respective vehicles were supposed to follow. Based on discrepancies in the execution of commands, the analysis module 140 can identify which vehicle's incorrect movements led to the accident. For example, if one of the vehicles did not follow a respective master list (e.g., the command executed is not in the respective master list), the vehicle may be responsible for the accident because if both vehicles followed the master list, the accident may have been avoided. However, if both vehicles followed the master list and the accident still occurred, the cause may be an external factor (e.g., a poor opposing driver, poor weather, etc.) or may indicate that the respective master lists need to be adjusted by the analysis module 140. For example, if the cause of the accident is that the master list indicated that a first vehicle was to move 0.5 meters, the analysis module 140 may adjust the master list such that in future situations that match the segment's conditions, the master list indicates that the vehicle is to move 0.1 meters.

The method terminates at 315.

Figure 4:
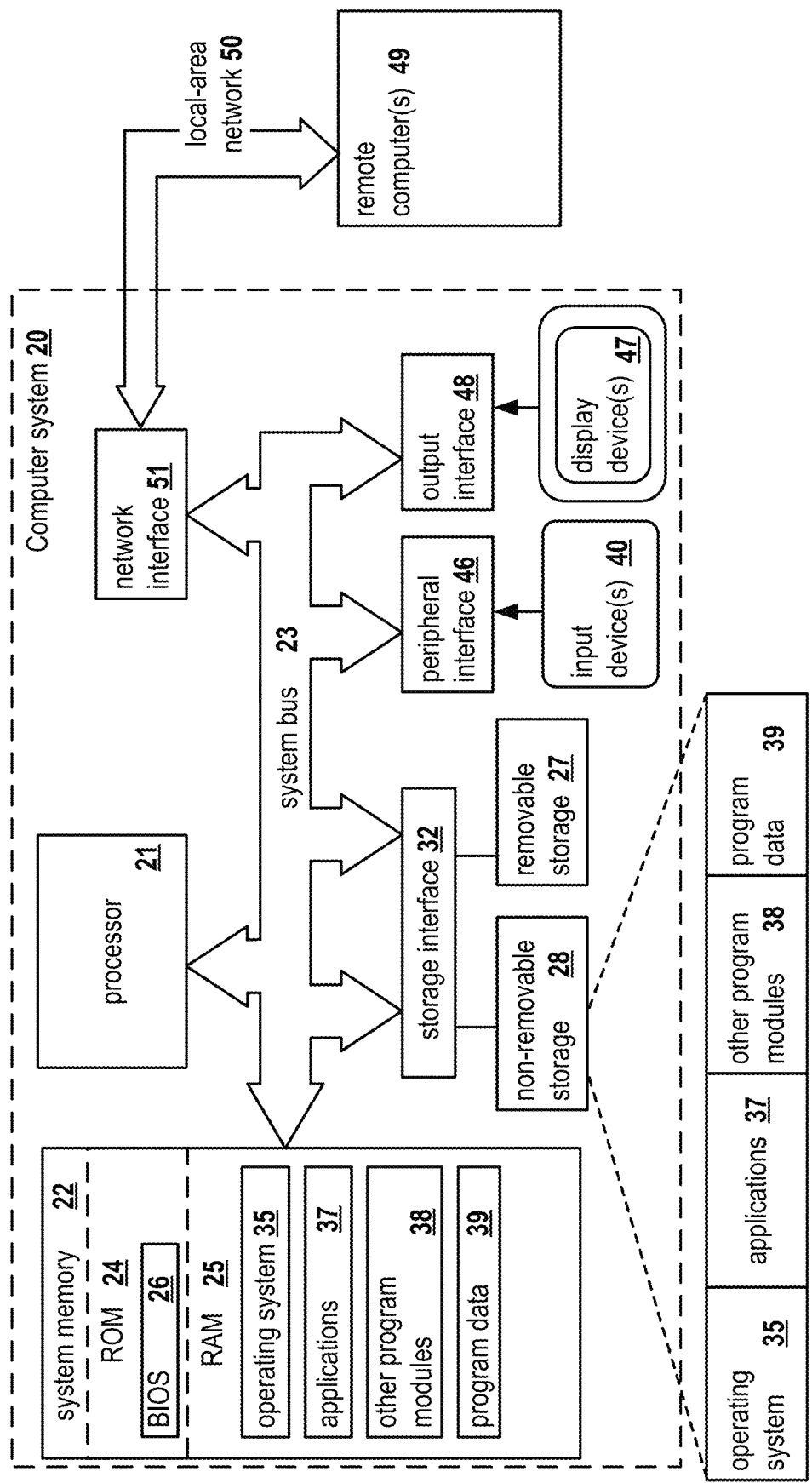
FIG. 4 is a block diagram of a computer system on which the disclosed system and method can be implemented according to an exemplary aspect.

FIG. 4 is a block diagram illustrating a computer system 20 on which aspects of systems and methods for post-route analysis of an autonomous vehicle may be implemented in accordance with an exemplary aspect. It should be noted that the computer system 20 can correspond to the analysis module 140, or other components of system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for driving organization and subsequent analysis of an autonomous vehicle, comprising:
   dividing, by a processor, a path of a vehicle into a plurality of segments based on predetermined conditions;
   monitoring, by the processor, both behavior of the vehicle and driving conditions during each of the plurality of segments, wherein the behavior comprises a plurality of commands executed by the vehicle based on the driving conditions while navigating through the path;
   storing, by the processor, the behavior and the driving conditions in a plurality of records of an immutable storage;
   determining, by the processor, whether an accident has occurred involving the vehicle;
   in response to determining that the accident has occurred, retrieving for the plurality of segments, by a processor, the behavior and the driving conditions from the immutable storage;
   reconstructing, by the processor, the path using the retrieved behavior and the driving conditions and the plurality of segments;
   determining, based on the reconstructed path, a cause of the accident by identifying a first command of the plurality of commands taken during a first driving condition that resulted the accident; and
   adjusting a master list of commands, used by the vehicle to select commands to execute during various driving conditions, such that the first command is not executed by the vehicle during the first driving condition during future navigation on the path.

2. The method of claim 1, wherein the immutable storage comprises one or more of a blockchain network, and a hash graph.

3. The method of claim 2, further comprising:
   storing the behavior in remote immutable storage;
   determining that a network connection is lost;
   in response to losing the network connection, storing records in local immutable storage; and
   in response to the network being restored, synchronizing the local immutable storage with the remote immutable storage.

4. The method of claim 1, wherein the master list of commands is a first master list of commands, and wherein the vehicle is a first vehicle and the accident involves a second vehicle, further comprising:
   identifying, from the plurality of records in the immutable storage, a first record indicating the first command executed by the first vehicle prior to the accident and a second record indicating a second command executed by the second vehicle;
   determining whether the first command is in the first master list of commands that the first vehicle should follow;
   determining whether the second command is in a second master list of commands that the second vehicle should follow;
   in response to determining that the first command is in the first master list and the second command is not in the second master list, determining that an incorrect movement by the second vehicle is the cause of the accident.

5. The method of claim 4, further comprising:
   in response to determining that the first command is not in the first master list and the second command is in the second master list, determining that an incorrect movement by the first vehicle is the cause of the accident.

6. The method of claim 4, further comprising:
   in response to determining that the first command is not in the first master list and the second command is not in the second master list, determining that incorrect movements by both vehicles are the cause of the accident.

7. The method of claim 4, further comprising:
   in response to determining that the first command is in the first master list and the second command is in the second master list, determining that an external factor is the cause of the accident.

8. The method of claim 4, further comprising:
   in response to determining that the first command is in the first master list and the second command is in the second master list, adjusting the first command and the second command in the first master list and the second master list, respectively, to prevent future accidents by the first vehicle and the second vehicle.

9. A system for driving organization and subsequent analysis of an autonomous vehicle, comprising a processor configured to:
   divide a path of a vehicle into a plurality of segments based on predetermined conditions;
   monitor both behavior of the vehicle and driving conditions during each of the plurality of segments, wherein the behavior comprises a plurality of commands executed by the vehicle based on the driving conditions while navigating through the path;
store the behavior and the driving conditions in a plurality of records of an immutable storage;
determine whether an accident has occurred involving the vehicle;
in response to determining that the accident has occurred, retrieve for the plurality of segments the behavior and the driving conditions from the immutable storage;
reconstruct the path using the retrieved behavior and the driving conditions and the plurality of segments;
determine, based on the reconstructed path, a cause of the accident by identifying a first command of the plurality of commands taken during a first driving condition that resulted the accident; and
adjust a master list of commands, used by the vehicle to select commands to execute during various driving conditions, such that the first command is not executed by the vehicle during the first driving condition during future navigation on the path.

10. The system of claim 9, wherein the immutable storage comprises one or more of a blockchain network, and a hash graph.

11. The system of claim 10, wherein the processor is further configured to:
store the behavior in remote immutable storage;
determine that a network connection is lost;
in response to losing the network connection, store records in local immutable storage; and
in response to the network being restored, synchronize the local immutable storage with the remote immutable storage.

12. The system of claim 9, wherein the master list of commands is a first master list of commands, and wherein the vehicle is a first vehicle and the accident involves a second vehicle, wherein the processor is further configured to:
identify, from the plurality of records in the immutable storage, a first record indicating the first command executed by the first vehicle prior to the accident and a second record indicating a second command executed by the second vehicle;
determine whether the first command is in the first master list of commands that the first vehicle should follow;
determine whether the second command is in a second master list of commands that the second vehicle should follow;
in response to determining that the first command is in the first master list and the second command is not in the second master list, determine that an incorrect movement by the second vehicle is the cause of the accident.

13. The system of claim 12, wherein the processor is further configured to:
in response to determining that the first command is not in the first master list and the second command is in the second master list, determine that an incorrect movement by the first vehicle is the cause of the accident.

14. The system of claim 12, wherein the processor is further configured to:
in response to determining that the first command is not in the first master list and the second command is not in the second master list, determine that incorrect movements by both vehicles are the cause of the accident.

15. The system of claim 12, wherein the processor is further configured to:
in response to determining that the first command is in the first master list and the second command is in the second master list, determine that an external factor is the cause of the accident.

16. The system of claim 12, wherein the processor is further configured to:
in response to determining that the first command is in the first master list and the second command is in the second master list, adjust the first command and the second command in the first master list and the second master list, respectively, to prevent future accidents by the first vehicle and the second vehicle.

17. A non-transitory computer readable medium comprising computer executable instructions for driving organization and subsequent analysis of an autonomous vehicle, including instructions for:
dividing a path of a vehicle into a plurality of segments based on predetermined conditions;
monitoring both behavior of the vehicle and driving conditions during each of the plurality of segments, wherein the behavior comprises a plurality of commands executed by the vehicle based on the driving conditions while navigating through the path;
storing the behavior and the driving conditions in a plurality of records of an immutable storage;
determining whether an accident has occurred involving the vehicle;
in response to determining that the accident has occurred, retrieving for the plurality of segments the behavior and the driving conditions from the immutable storage;
reconstructing the path using the retrieved behavior and the driving conditions and the plurality of segments;
determining, based on the reconstructed path, a cause of the accident by identifying a first command of the plurality of commands taken during a first driving condition that resulted the accident; and
adjusting a master list of commands, used by the vehicle to select commands to execute during various driving conditions, such that the first command is not executed by the vehicle during the first driving condition during future navigation on the path.

18. The non-transitory computer readable medium of claim 17, wherein the immutable storage comprises one or more of a blockchain network, and a hash graph.

19. The non-transitory computer readable medium of claim 18, further including instructions for:
storing the behavior in remote immutable storage;
determining that a network connection is lost;
in response to losing the network connection, storing records in local immutable storage; and
in response to the network being restored, synchronizing the local immutable storage with the remote immutable storage.

20. The non-transitory computer readable medium of claim 17, wherein the master list of commands is a first master list of commands, and wherein the vehicle is a first vehicle and the accident involves a second vehicle, further including instructions for:
identifying, from the plurality of records in the immutable storage, a first record indicating the first command executed by the first vehicle prior to the accident and a second record indicating a second command executed by the second vehicle;
determining whether the first command is in the first master list of commands that the first vehicle should follow;

determining whether the second command is in a second master list of commands that the second vehicle should follow;

in response to determining that the first command is in the first master list and the second command is not in the second master list, determining that an incorrect movement by the second vehicle is the cause of the accident.

* * * * *